(12) United States Patent
Jeffries et al.

(10) Patent No.: US 9,845,766 B2
(45) Date of Patent: Dec. 19, 2017

(54) PISTON CROWN TO RAISE COMPRESSION RATIO

(71) Applicant: Ford Global Technologies, LLC, Dearborn, MI (US)

(72) Inventors: Jonathan Patrick Jeffries, Canton, MI (US); Brian Denis Armstrong, Whitmore Lake, MI (US); Thomas Jeremy Kostrzewski, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 14/623,785

(22) Filed: Feb. 17, 2015

(65) Prior Publication Data

US 2016/0237945 A1    Aug. 18, 2016

(51) Int. Cl.
| F02F 3/28 | (2006.01) |
| F02B 75/22 | (2006.01) |
| F02B 23/06 | (2006.01) |
| F02B 23/08 | (2006.01) |
| F02F 3/26 | (2006.01) |

(52) U.S. Cl.
CPC .............. *F02F 3/28* (2013.01); *F02B 23/063* (2013.01); *F02B 23/08* (2013.01); *F02B 75/22* (2013.01); *Y02T 10/125* (2013.01)

(58) Field of Classification Search
CPC ........ F02B 75/22; F02B 23/063; F02B 23/08; F02F 3/26; F02F 3/00; F02F 3/28

USPC ............ 123/294, 193.6, 276, 279, 280, 307
See application file for complete search history.

(56) References Cited

U.S. PATENT DOCUMENTS

| 5,738,057 A * | 4/1998 | Vallejos | F01L 1/053 123/193.5 |
| 5,816,229 A * | 10/1998 | Roderweiss | F02B 23/08 123/193.6 |
| 7,650,872 B2 * | 1/2010 | Nishimoto | F02B 17/005 123/193.6 |
| 2003/0172896 A1* | 9/2003 | Sczepanski | F02B 23/104 123/193.6 |
| 2012/0255520 A1* | 10/2012 | Grover, Jr. | F02F 3/28 123/445 |

FOREIGN PATENT DOCUMENTS

FR    2861431 A1 *   4/2005  ............ F02B 17/005

* cited by examiner

*Primary Examiner* — Mahmoud Gimie
(74) *Attorney, Agent, or Firm* — Damian Porcari; Brooks Kushman P.C.

(57) ABSTRACT

A piston includes a crown having a deck, a spark recess, an exhaust valve recess, and an intake valve recess. The piston also includes a wedge disposed on the crown extending from the exhaust valve recess and the intake valve recess toward the spark recess above the deck. The wedge is a planar wedge disposed at an angle substantially parallel to an associated exhaust valve received by the exhaust valve recess. The crown is symmetrical about a piston center line.

12 Claims, 3 Drawing Sheets

PISTON CROWN TO RAISE COMPRESSION RATIO

TECHNICAL FIELD

The present disclosure relates to internal combustion engines for vehicles.

BACKGROUND

Vehicles include internal combustion engines. Internal combustion engines provide torque as motive power for the vehicle. Combustion within the engine provides torque. Combustion may be accomplished in a variety of ways. For example an engine may utilize a homogenous charge compression ignition system (HCCI) in which an air fuel mixture is compressed at a temperature for ignition. Likewise, an engine may utilize a spark ignition system (SI) in which an air fuel mixture interacts with an electrical charge from a spark plug to combust.

A compression ratio within the internal combustion engine directs the amount of torque produced in the fuel efficiency of the vehicle. The compression ratio may be controlled using mechanism such as variable valve timing and throttle control. Also, a piston within the engine may affect the compression ratio. The geometry, shape, and stroke of the piston may be used to optimize the compression ratio and as such the fuel efficiency of the vehicle. Therefore, a piston having a geometry that improves combustion within the engine may be advantageous.

SUMMARY

A piston includes a crown having a deck, a spark recess, an exhaust valve recess, and an intake valve recess. The piston also includes a wedge disposed on the crown extending from the exhaust valve recess and the intake valve recess toward the spark recess above the deck. The wedge is a planar wedge disposed at an angle substantially parallel to an associated exhaust valve received by the exhaust valve recess. The crown is symmetrical about a piston center line.

An engine includes an engine block and cylinder head defining a cylinder. The engine further includes a piston disposed within the cylinder having a symmetric dome crown including a wedge extending from an intake valve recess and an exhaust valve recess. The wedge slopes above a deck toward a center of the crown parallel to an exhaust valve being received by the exhaust valve recess. The piston further includes an arcuate ramp disposed between the valve recesses tangent to the deck and the wedge.

A dome piston having a crown symmetric about a center line, each half of the crown includes a deck, an intake valve relief and an exhaust valve relief, a spark plug recess at the apex, and an arcuate ramp disposed between the valve reliefs. The valve reliefs each extend below the deck to a planar wedge extending from the valve reliefs above the deck to an apex. The arcuate ramp extends tangentially between the deck and the wedge.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
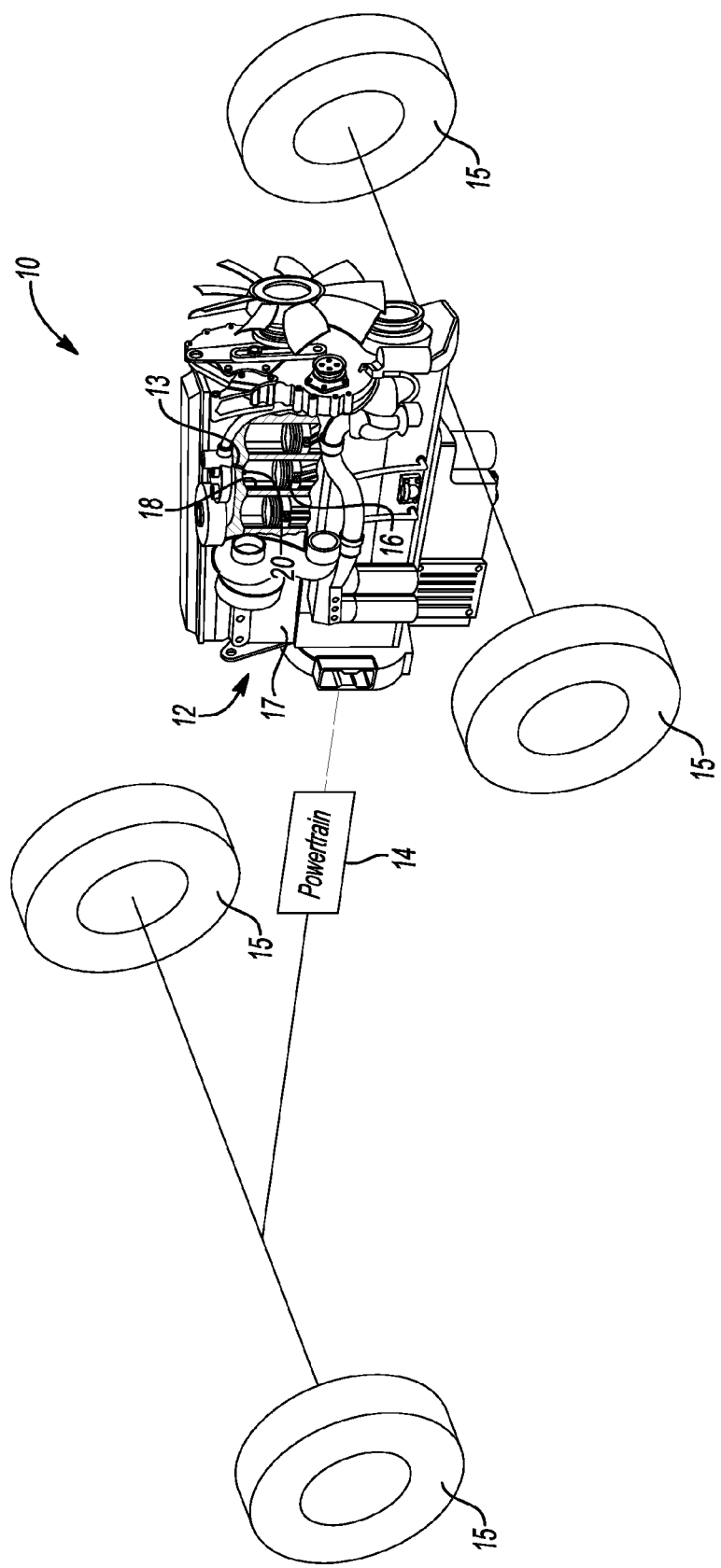
FIG. 1 is a perspective of a view of a vehicle having a direct injection engine with a piston having an as-cast piston crown.

Referring to FIG. 1, a vehicle 10 having an internal combustion engine 12 is shown. The internal combustion engine 12 is mechanically coupled to a vehicle powertrain 14. The internal combustion engine 12 produces torque which is transferred through the powertrain 14 to the vehicle wheels 15. The transfer of torque through the powertrain 14 to the wheels 15 provides motive force to drive the vehicle 10. In at least one embodiment, the engine 12 is depicted and described as a direct injection internal combustion engine 12 in which an air and fuel mixture is directly into the engine 12 in order to provide combustion. Using a direct injection internal combustion engine 12 requires at least one fuel injector position 13 configured to inject fuel directly into a cylinder 18.

As will be described in more detail below, the engine 12 may include a piston 16 that reciprocates within the cylinder 18. The cylinder is defined on an engine block 17. In at least one embodiment, the engine 12 may include one piston 16 or plurality of pistons 16, such as an engine configuration including six pistons 16 or eight pistons 16. The piston 16 may also be a dome piston 16. The cylinder 18 may include a plurality of configurations. For example, an engine 12 having a plurality of pistons 16 reciprocates within a plurality of cylinders 18. The plurality of cylinders 18 may have a plurality of configurations. The cylinders 18 may be in-line or in a V-configuration. Symmetrical piston geometry may allow for a single piston design to be used with each cylinder 18, whether an in-line or V-configuration is used.

The air fuel mixture may be directly injected into the cylinder 18, through a fuel injector position 13, of the engine 12. Further, the engine 12 includes a spark plug 20. The spark plug 20 provides a spark as a source of ignition to combust the air and fuel mixture within the cylinder 18. Combustion of the air and fuel mixture forces the piston 16 downward reciprocating the piston 16 within the cylinder 18. As the piston 16 reciprocates within the cylinder 18, moving in the direction of the spark plug 20, the spark plug 20 may further ignite the air and fuel mixture providing further combustion. This combustion energy is used by the engine 12 to provide torque through the vehicle powertrain 14 to the vehicle wheels 15.

As will be described in more detail below, the rate of combustion within the engine 12 is dependent on a variety of factors. For example, the stroke of the piston 16 within the cylinder 18 may affect combustion. Likewise, the size and shape of the piston 16 may increase the rate at which the air fuel mixture reaches the spark from the spark plug 20. Optimizing the size and shape of the piston 16 to increase combustion within the engine 12 may increase a compression ratio of the engine 12. Increasing the compression ratio the engine 12 may aid in improving fuel efficiency and reducing emissions.

Figure 2:
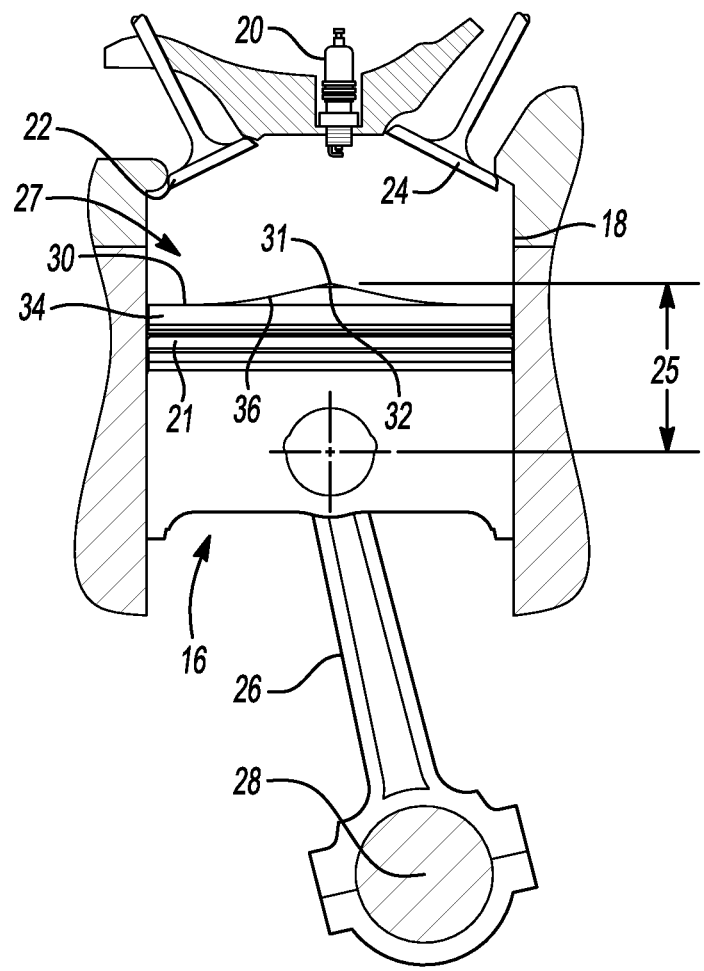
FIG. 2 is a cross-sectional view of a piston inside a piston cylinder utilizing a piston crown geometry to improve fuel flow.

Referring to FIG. 2, a cross-sectional view of the piston 16 within the cylinder 18 is shown. The piston 16 as well as the cylinder 18 may define a cylindrical shape. The combustible gases defined by the air and fuel mixture are sealed within the cylinder 18 by plurality of piston rings 21. The air fuel mixture is injected into the cylinder 18 through an intake valve 22. Likewise, gases resulting from combustion of the air and fuel mixture leave the cylinder 18 through an exhaust valve 24. The valve angles between the intake valve 22 and the exhaust valve 24 are different. Ignition of the air and fuel mixture by the spark plug 20 creates a downward force on the piston 16. The downward force acting on the piston 16 causes a connecting rod 26 to rotate. The connecting rod 26 mechanically couples the piston 16 to a crankshaft 28. The rotational movement of the connecting rod 26 is transferred to the crankshaft 28. This provides torque through the vehicle powertrain 14 to the vehicle wheels 15.

As stated above, ignition timing through interaction of spark from the spark plug 20 and the air and fuel mixture is an important factor in optimizing the compression ratio. Further, the geometrical design of a crown 30 of the piston 16 may also impact the timing of the interaction between the spark from the spark plug 20 and the air and fuel mixture. For example, the piston crown 30 may define a spark relief recess 32 defined at an apex 31 of a deck 34. The piston crown 30 may also include a wedge 36 sloping vertically toward the spark relief recess 32. The wedge 36 comprises a planar surface resulting in a planar wedge 36. The wedge 36 may also be defined as a wedge pop-up. When the air and fuel mixture is injected into the cylinder 18, the wedge 36 aids in pushing the fuel toward the spark relief recess 32. The wedge 36 aids in accurately and efficiently guiding the air and fuel mixture toward the spark relief recess 32 in order to improve combustion from the spark plug 20. Therefore, the slope of the wedge 36 may be defined such that the compression ratio of the engine 12 is optimized.

The piston 16 within the cylinder 18 defines a compression ratio. The compression ratio dictates the amount of force acting on the piston and as such the rate at which the crankshaft 28 spins. A high compression ratio may be advantageous. Increasing the compression ratio allows for more thermal energy, through combustion of the air and fuel mixture, to be converted to mechanical energy, providing torque to the vehicle wheels 15. The compression ratio may be defined by the volume of a combustion chamber 27 at the top of the piston stroke and at the bottom of the piston stroke. The volume of the combustion chamber 27 changes with the stroke length of the piston 16 within the cylinder 18. Also, the volume of the combustion chamber changes based on the geometry of the piston crown 30. A compression height 25 defined between the center of the coupling between the piston 16 and the connecting rod 26, and the piston crown 30. The compression height 25 affects the compression ratio by decreasing the volume of the combustion chamber 27. Therefore, by adapting the geometry of the piston crown 30 to add volume to the compression height 25 while providing clearance for the intake valve 22 and the exhaust valve 24 as well as the spark plug 20, the compression ratio may be increased.

Figure 3:
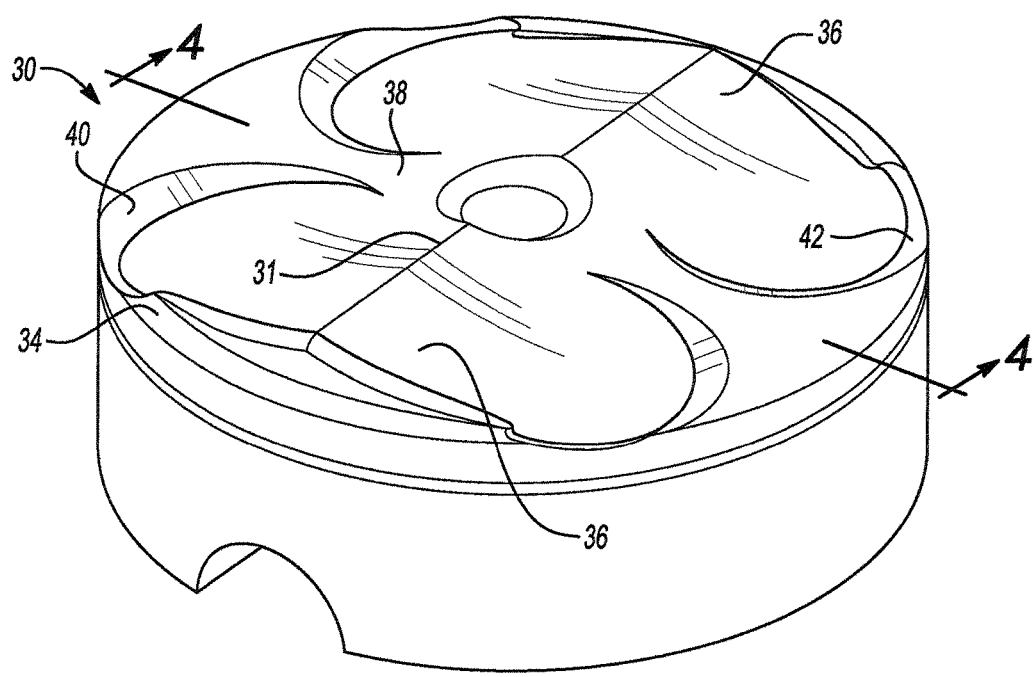
FIG. 3 is a perspective view of a piston crown of the present disclosure.
Figure 4:
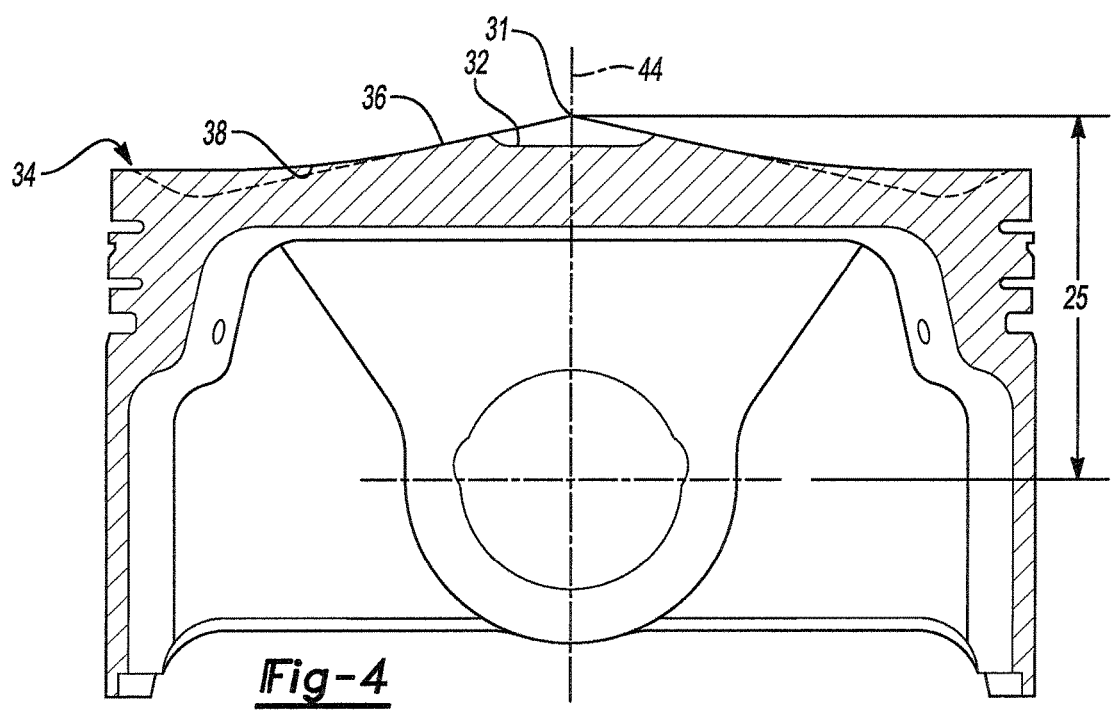
FIG. 4 is a cross-sectional view of a piston crown taken along lines 4-4 of FIG. 3 of the present disclosure

Referring to FIGS. 3 and 4, a perspective view and a cross-sectional view along lines 4-4 of the piston crown 30 is shown. The piston crown 30 may further include a ramp 38 defined on the deck 34. The ramp 38 is an arcuate ramp 38 defined between an intake valve recess 40 and an exhaust valve recess 42. The ramp 38 is also tangent to the compression height 25. In order to achieve a wedge angle that maximizes the piston crown 30, the ramp 38 fills in volume above the compression height 25 to achieve a desired compression ratio. Therefore, the ramp 38 adds volume to the compression height 25. Using the ramp 38 to add volume to the compression height 25 allows the piston crown 30 to achieve an improved fuel flow rate through the wedge 36. Improving the fuel flow rate allows the air fuel mixture, when injected into the cylinder 18, to reach the spark relief recess 32 quicker. This improves combustion of the engine 12 in the overall fuel efficiency of the vehicle 10.

Further, as stated above, the intake and exhaust valve angles may be different from the intake valve 22 and the exhaust valve 24. The exhaust valve recess 42 receives the exhaust valve 24 and the intake valve recess 40 receives the intake valve 22. Adding the ramp 38 to the deck 34 allows the piston crown 30 to be symmetrical. The ramp 38 allows the wedge 36 to be substantially parallel to the exhaust valve 24. The wedge 36 extends between the exhaust valve recess 42 to the intake valve recess 40. Because the wedge 36 is substantially parallel to the exhaust valve 24, the exhaust valve recess 42 receives the exhaust valve 24 within tight tolerances. Since the angles between the exhaust valve 24 and the intake valve 22 are different and the wedge 36 extends from the exhaust valve recess 42 to the intake valve recess 40, the ramp 38 provides extra clearance for the intake valve 22 and allows the wedge 36 to maximize the piston crown 30. Providing extra clearance for the intake valve 22 aids to increase the compression ratio by providing more space for the piston crown 30 to receive the intake valve 22 and allows the piston crown 30 to be symmetrical about a piston center line 44.

Maximizing the piston crown 30 optimizes the fuel flow rate within the cylinder 18. When the piston crown 30 is maximized, the wedge 36 has a maximum slope toward the spark relief recess 32 to achieve an increased compression ratio. The addition of the ramp 38 provides advantages to the piston crown 30. The ramp 38 eliminates a sharp edge or drop-off between the deck 34 and the wedge 36. The ramp 38 provides a radius to tighten the geometry of the piston crown 30. Tightening the geometry of the piston crown 30 allows the ramp 38 to add volume above the compression height 25. Adding volume above the compression height 25 decreases the volume of the combustion chamber but still allows clearance for the intake valve 22, the exhaust valve 24, and the spark plug 20. This aids to increase the compression ratio. By improving and maintaining the clearances, the ramp 38 allows the wedge 36 to slope at a maximum angle to improve the fuel flow rate to the spark plug and further increase the compression ratio. The ramp 38 allows the wedge 36 to peak at the piston center line 44. This allows the crown 30 to be a symmetric dome crown 30. Maintaining symmetry and maximizing the piston crown 30 improves performance of the piston 16 and therefore of the engine 12.

As stated above, adding the ramp 38 provides for various advantages of the piston crown 30. A further advantage realized through using the ramp 38 to tighten the piston crown geometry is a reduction in the machining process. The addition of the ramp 38 allows substantially the whole piston crown 30 to be as cast. The geometry of the piston crown 30 allows the piston crown 30 to be formed using a casting riser (not shown). The only portion of the piston crown 30 needing to be machined after casting is the spark relief recess 32. This substantially reduces the amount of machining needed to form the piston crown 30. Addition of the ramp 38 aids to reduce the manufacturing processes required to form the piston crown 30. This may save time, cost, and manufacturing expenses.

Tightening the geometry of the piston crown 30 through addition of the ramp 38 creates a more economical piston 16. For example, an advantage of using a casting process is such that the complex piston crown geometry is easier and more economical to form. Further, forming the piston crown 30 using casting provides for a more dimensionally stable and durable piston crown geometry. Likewise, the cast may provide for repetitive use to form multiple piston crowns 30 required for production. Replicating the piston crown geometry quickly and efficiently improves the manufacturing of the piston 16 and likewise the engine 12. Therefore, addition of the ramp 38 improves efficiency of manufacturing the piston 16 and allows for a more durable piston crown 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A piston comprising:
   a crown, symmetrical about a piston center line, having a deck, a spark recess, an exhaust valve recess, and an intake valve recess;
   a wedge disposed on the crown extending from the intake and exhaust valve recesses toward the spark recess above the deck at an angle substantially parallel to an associated exhaust valve; and
   a ramp disposed between the valve recesses, extending tangentially from the deck to the wedge.

2. The piston of claim 1 wherein the ramp extends from the deck to the spark recess.

3. The piston of claim 1 wherein the wedge comprises a planar surface.

4. An engine comprising:
   an engine block and cylinder head defining a cylinder; and
   a piston disposed within the cylinder having a symmetric dome crown including a wedge extending from an intake valve recess and an exhaust valve recess sloping above a deck toward a center of the crown parallel to an exhaust valve being received by the exhaust valve recess and an arcuate ramp disposed between the valve recesses tangent to the deck and the wedge.

5. The engine of claim 4 wherein the symmetric dome crown is cast.

6. The engine of claim 4 further comprising a spark recess disposed at an apex of the wedge.

7. The engine of claim 6 wherein the spark recess is machined from a casting riser extending above the wedge.

8. The engine of claim 4 further comprising a fuel injector position configured to inject fuel directly into the cylinder.

9. The engine of claim 4 wherein the cylinder defines a V-configuration.

10. A dome piston having a crown symmetric about a center line, each half of the crown comprising:
    a deck;
    an intake valve relief and an exhaust valve relief each extending below the deck to a planar wedge extending from the valve reliefs above the deck to an apex;
    a spark plug recess at the apex; and
    an arcuate ramp disposed between the valve reliefs and extending tangentially between the deck and the wedge.

11. The piston of claim 10 wherein the symmetric crown is cast.

12. The piston of claim 10 wherein the planar wedge is substantially parallel to an exhaust valve being received by the exhaust valve relief.

* * * * *